United States Patent [19]
Haberl

[11] Patent Number: 6,105,620
[45] Date of Patent: Aug. 22, 2000

[54] FLEXIBLE TUBE DEVICE

[76] Inventor: Johann Haberl, Fiskarholmsgränd 2, S 127 41 Skärholmen, Sweden

[21] Appl. No.: 08/629,346

[22] Filed: Apr. 8, 1996

[30] Foreign Application Priority Data

Apr. 6, 1995 [SE] Sweden .................................. 9501307

[51] Int. Cl.[7] .................................................. F16L 55/00
[52] U.S. Cl. ......................... 138/118; 138/148; 138/103; 138/DIG. 8; 138/138
[58] Field of Search ................................ 138/118, 108, 138/103, 109, DIG. 8, 148, 178, 138; 181/272

[56] References Cited

U.S. PATENT DOCUMENTS

| | | | |
|---|---|---|---|
| 2,704,556 | 3/1955 | Blish | 138/DIG. 8 X |
| 2,998,028 | 7/1961 | Rohde . | |
| 3,032,357 | 5/1962 | Shames et al. | 138/DIG. 8 X |
| 3,402,741 | 9/1968 | Yurdin . | |
| 4,307,754 | 12/1981 | Muratsubaki | 138/DIG. 8 X |
| 4,327,775 | 5/1982 | Tally . | |
| 4,456,034 | 6/1984 | Bixby | 138/DIG. 8 X |
| 4,463,779 | 8/1984 | Wink et al. | 138/DIG. 8 X |
| 4,600,146 | 7/1986 | Ohno | 138/DIG. 8 X |
| 4,669,508 | 6/1987 | Neaves | 138/DIG. 8 X |
| 4,842,174 | 6/1989 | Sheppard et al. | 138/DIG. 8 X |
| 5,263,646 | 11/1993 | McCauley | 138/DIG. 8 X |
| 5,365,025 | 11/1994 | Kraai et al. | 181/272 X |
| 5,573,039 | 11/1996 | Mang | 138/DIG. 8 X |
| 5,670,756 | 9/1997 | Ohtaka et al. | 181/272 X |

*Primary Examiner*—Patrick F. Brinson
*Attorney, Agent, or Firm*—Browdy and Neimark

[57] ABSTRACT

The invention relates to a flexible tube device, which is repeatedly reshapable by action of reshaping forces comprising bending forces and which has the capability of substantially maintaining its shape received by the reshaping as the forces are released. This device is characterized in that the device (1) comprises a flexible part comprising a flexible inner hose (3) and/or a flexible outer hose, which may surround the flexible inner hose (3) and be provided along substantially the entire flexible part and preferably inside the outer hose, outside the inner hose or between the outer hose and the inner hose, a bend stiffening member (4) which is plastically deformable at the reshaping of the tube device and which after the removal of the reshaping forces substantially retains the shape received by the plastic deformation and thereby substantially determines the shape of the tube device.

14 Claims, 3 Drawing Sheets

FLEXIBLE TUBE DEVICE

BACKGROUND OF THE INVENTION

1. Technical Field

The present invention relates to a flexible tube device, which is repeatedly reshapable by bending, preferably by hand, and which after the reshaping maintains its shape, preferably also under the influence of gravity when the device is kept in a maximum elongated shape in the horizontal direction and is fixed at one end, but otherwise is free from support.

The tube device according to the invention is particularly suited for conducting a fluid, gaseous or in liquid state, to and from an adjustable point and in an adjustable direction. Examples of such use is exhaustion of contaminated gases, liquids or solids, in particularly in form of droplets or particles carried by a gas, such as splashes from a machine tool or weld smoke, or conduction of gas or liquid to a point, such as cutting fluid or cooling air, etc.

For such applications it may according to the invention be appropriate to provide the device fixed at one end and with the other end freely adjustable, preferably by hand, within a wide adjustment range within the range of the device, preferably with reshapable forces applied at the free moveable end or for example at a distance from this end, which does not exceed 20% of the length of the device.

2. Prior Art

Flexible tube devices of the type mentioned above are previously known and comprise for example flexible metal hoses of profiled, spirally wound metal strips or a plurality of means of ball joint type. However, such known devices suffer from a number of disadvantages, such as high costs, hard wear, limited flexibility and a tendency to clog, especially if the duct contains flow disturbing parts.

OBJECT AND SUMMARY OF THE INVENTION

The present invention relates to a tube device, especially flexible, which is reshapable to a maintainable shape and which has considerable advantages compared to the previous known devices regarding costs, workability and/or adaptability to different applications, for example by providing an undisturbed flow through a hose with low flow resistance and preferably plain inner surface, which will be apparent by the following description.

A flexible tube device according to the invention comprises a flexible outer hose and/or a flexible inner hose and during reshaping, especially bending, of the tube device a ductile deformable bend stiffening member, hereinafter referred to as stiffener, which is provided close to and extending along this hose or these hoses. The stiffener is preferably provided inside the outer hose and/or outside the inner hose. However, the stiffener could be more or less integrated with or at the inner hose and/or the outer hose, for example embedded, glued or otherwise bonded to the hose or hoses. If only one hose is to be used the stiffener may be provided on the outside or the inside or the inside as well as the outside of the hose, preferably using at least two stiffening members. If two or more hoses are used, it is further possible to provide the stiffener in form of one or more stiffening members on the outside as well as on the inside of one or more of these hoses.

BRIEF DESCRIPTION OF THE DRAWINGS

The invention will be described in detail below with reference to the accompanying drawings, in which.

DETAILED DESCRIPTION OF THE PREFERRED EMBODIMENTS OF THE INVENTION

Figure 1:
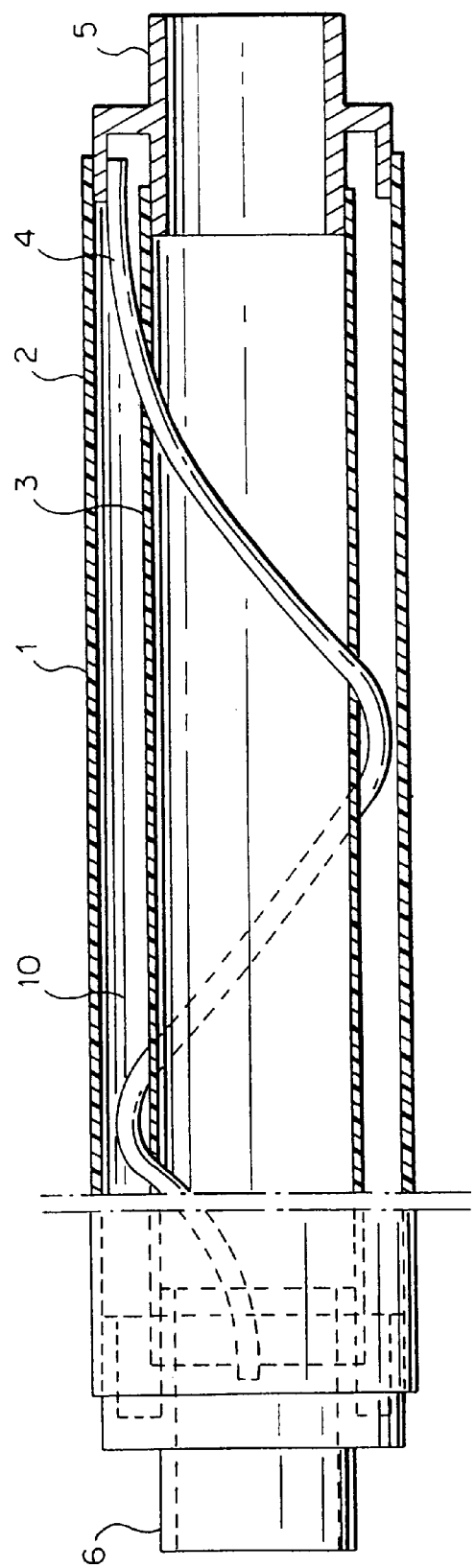
FIG. 1 shows, partly in cross section, a tube device according to the invention.

FIG. 1 shows a flexible hose device according to the invention comprising a flexible outer hose 2 and a flexible inner hose 3 and a stiffener 4 provided thereinbetween. These parts extend between end connecting means 5, 6 provided at opposite ends of the tube device.

The flexible hoses may be of a material that is suitable for the intended application, such as metal, rubber, plastic or a combination of two or more thereof. The hoses may be provided with reinforced, stretch preventing means, such as ring shaped or screw line shaped ("spirally shaped") means, such as string shaped (thread shaped) means on the inside or outside or in the wall of the hose and preferably fixed bounded to and in the wall of the hose, respectively. These hose reinforcing means are preferably made of metal and preferably with high yield strength, such as metal wire, in particularly steel wire, and prevents elongation of the hose in a radially direction and also prevents the wear of the hose. The hoses are preferably provided with means for limiting stretching in the lengthwise direction of the hoses, such as textile and plastic strings or cord strings in some other material. The hoses may preferably have a wave shaped, corrugated or bellows type of lengthwise section, which allows a limited extension and/or compression in the lengthwise direction of the hose, for example a change in length of up to 40%, up to 20%, up to 10% or up to 5%. To protect the hoses against wear it is suitable to position the ring or screw line shaped reinforcement means at the inward directed wave peaks of the outer hose and at the outward directed wave peaks of the inner hose.

The stiffener (bend stiffening member) has such a shape and is made of such a material that the stiffener, during reshaping (bending) of the tube device under the influence of the forces (bending forces) which perform the reshaping of the device, after a first elastic deformation, which preferably is as small as possible, after passing the yield strength of the material, undergoes plastic deformation to a new reshaped shape after the removal of the reshaping forces (bending forces) essentially retains this new shape, preferably with as little spring back as possible, and thereby essentially determines the shape of the tube device after the reshaping and removal of the reshaping forces. By providing the end connections 5, 6 of the tube device with fixed or force transmitting connections to the stiffener 4 it is possible, by means of the plastic deformation of the stiffener, to bring at least the end connections to substantially maintain the position in space, comprising the direction, with exception of the elastic spring back, which they received at the reshaping (bending) during the plastic deformation of the stiffener. The elastic spring back of the flexible part of the tube device when the reshaping forces (bending forces) are removed can be made small, for example less than 10% or less than 5% of the length of this part as bending takes place from a straight shape to the shape of a semi circle.

The stiffener is suitable made of a material which in relation to yield strength and rupture limit is low and/or elongation at rupture (rupture extension) is high. Suitable materials are preferably metals, for example metals and alloys based on aluminium, copper and especially iron. Steel, which in this context also could be pure iron is preferred, especially unalloyed steel or low-alloyed steel with a low carbon content, for example a carbon content of less than 0,3%, less than 0,2%, less than 0,1% or less than 0,05%, possibly coated with zinc or aluminium, and also stainless steel with high elongation at rupture. A high elongation at rupture is generally preferred, for example at least 10 %, at least 20%, at least 30% or at least 40%, measured on a 50 mm long measurement rod or 5× the diameter. The material is preferably used in a condition having high cold forming properties, for example in a dead annealing condition.

The stiffener may have a plurality of shapes and may consist of one, two or more separated or fully or partly connected members or parts. Preferably at least one such stiffening member extends along the entire length of the tube device and is preferably fixed at the end connection means at both ends of the device, to which also the outer and/or the inner hose is suitable connected. The connection between the stiffener and the end connecting means is preferably fixed and resistant against torsion, for example by gluing, especially if the end connecting means are made of a non-metallic material, for example plastic, or soldering and particularly welding if the end connecting means are made of metal, especially iron (steel). The connection may alternatively allow for a certain relative displacement, for example in the lengthwise direction of the stiffener and/or the tube device. If the stiffener comprises one or more string shaped, for example thread shaped elements, which extend along the entire length of the tube device such elements may be screw shaped around the central lengthwise axis of the tube device and the inner hose, for example with a pitch of less than 10, less than 5 or less than 2 turns/meter of the tube, but preferably at least one turn on the entire length of the device between the connection points of the ends of the device.

The stiffener may have the shape of one or more strings, for example homogeneous strings, such as a homogeneous rod (including wire) with a suitable cross section, for example round, oval, rectangular or square, etc. or inhomogeneous strings, such as tubes or compound material with a hard core surrounded by a softer outer layer, or have the shape of a tube of, for example, expanded metal or wire netting which surround the inner hose.

It has been shown that a suitable cross sectional area of the stiffener, the length of the flexible part of the device being 0,5–1 m, is an area which corresponds to a round wire of dead annealed steel with a low carbon content and with a yield strength of about 20–30 kp/mm2, a thickness of for example 3–10 mm, preferably 4–7 mm, for example 5 mm, and corresponding dimensions at other lengths.

To compensate the increase in bending moment with the distance from the point of action of the bending (reshaping) forces the stiffener may be shaped with a decreasing stiffness of flexing from the attachment point at the fixed end of the tube towards the freely adjustable end of the tube, for example by shaping the stiffener with a cross sectional area that decreases stepwise or continuously or gradually from the attachment point. This may be accomplished by designing individual stiffening strings stepwise or gradually tapered from the attachment end of the tube device or by letting one or more strings extend along the entire length of the tube device and one or more strings extend only a part of the first strings length from the attachment point at the attachment end, or by letting a screw line shaped stiffening string have a screw pitch that decreases towards the free end of the tube device.

To counteract the deflection caused by the gravity the plastically deformable stiffener may optionally be provided with stiffening means that extend from one end of the tube to the other end of the tube or a part of this distance and which is elastically fully capable of springing back, for example which does not pass the yield strength as said stiffening means is bent from a straight shape to a semi circular shape. These stiffening means bring a bending resistance to the device with only elastic elongation and absence of other stiffening means, which with horizontal attachment of one end of the device gives a deflection at the other free end corresponding to less than 20%, less than 10% or less than 5% of the free length of the device.

To counteract a too strong bending of the stiffener at the attachment point at the fixed end of the tube device, bend limiting means may be provided at the attachment point of the stiffener and at positions along the length of the stiffener, for example a funnel-shaped support, which surrounds the stiffener, for example at the attachment point, for example a funnel-surface or part thereof constituted by an arched bent generatrix. With such means the bending may be limited to a corresponding radius of curvature of at least 5%, at least 10%, at least 15%, at least 20% or at least 30% of the flexible part of the tube device.

As gas with high velocity is conducted through the tube device according to the invention, for example during exhaustion of contaminated air, disturbing noise could easily arise, and therefore a silencer could be desirable. This may be accomplished by providing the inner hose with apertures (perforations), preferably distributed along the entire length of the hose and around the circumference of the hose to access a ring shaped space between the inner and outer hose, which space acts or is provided with sound absorbing means, for example with a filling of a sound absorbing material, for example a fibrous material or a porous material.

The dimensions of the tube device may be varied within a wide range. The diameter of the inner hose may vary from for example at least 10 mm or at least 20 mm up to for example 100 mm or more, and the space between the inner and the outer hose may likewise be varied within a wide range, for example from 0 mm up to 50 mm or more, depending on the intended application. The length of the tube device may be varied within a wide range, for example from 10 cm up to 1 m or more. The maximum length is limited by the shape stability of the tube device under influence of gravity when fixed at only one end.

Figure 2:
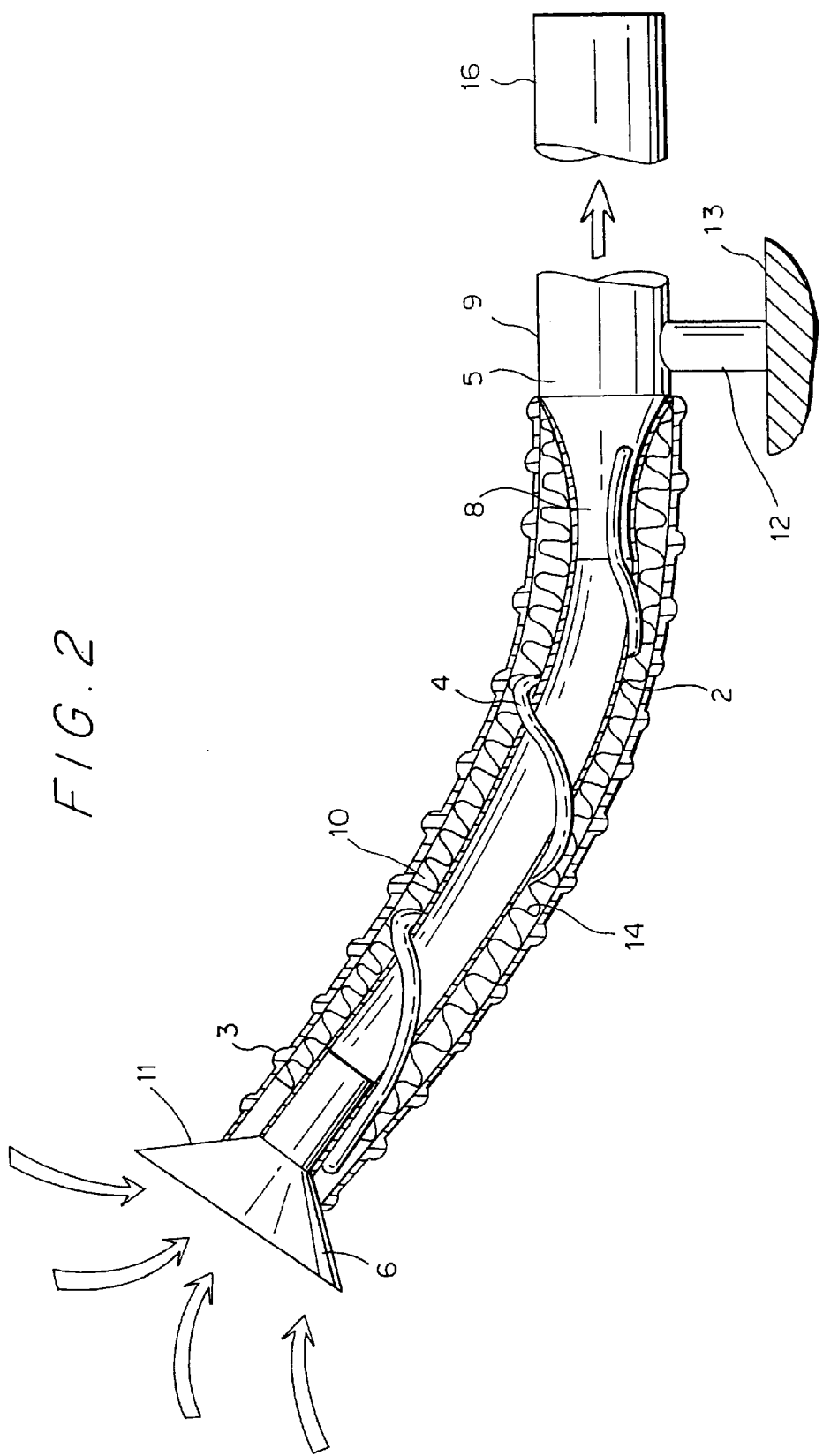
FIG. 2 shows, partly in cross section, an alternative embodiment of such a tube device.

The hoses and the stiffener (bend stiffening member) of the device shown in FIG. 2 are connected and fixed to a first end connecting means 5 in form of an exhaustion nozzle having two parts with different diameters. FIG. 2 further shows a first part 8 with a smaller diameter for connecting the inner hose 3 and a second part 9 with larger diameter for connecting the outer hose 2. The stiffener 4 is also connected to the end connecting means 5, said stiffener having the shape of a metal wire (metal rod), which is fixed to the end connecting means 5, preferably by welding or soldering or gluing if the end connecting means is made of metal and preferably by gluing if the end connecting means is made of a nonmetal material, such as plastic, and which is wound in a screw shape and extending in the lengthwise direction of the tube device in a space 10 between the inner and outer hose. At the other end of the tube device is end connecting means 6 provided in a corresponding way, and to which both the hoses and the stiffener are connected; according to the shown embodiment comprising two parts with different diameters, to which the hoses are connected, and an attachment point for the metal wire. In the shown embodiment the attachment point 6, which acts as a gas inlet, is provided with an inlet funnel 11 to accomplish a desired distribution of the incoming flow rate of the gas at the inlet. The end connecting means 5 is fixed at a console 12 provided on a frame 13, in relation to which the end of the hose with the inlet funnel 11 is adjustable by hand in desired positions, but the fixation of the end connecting means 5 may also be accomplished by other means, for example by the end of a conducting tube 16 for exhaustion.

Figure 3:
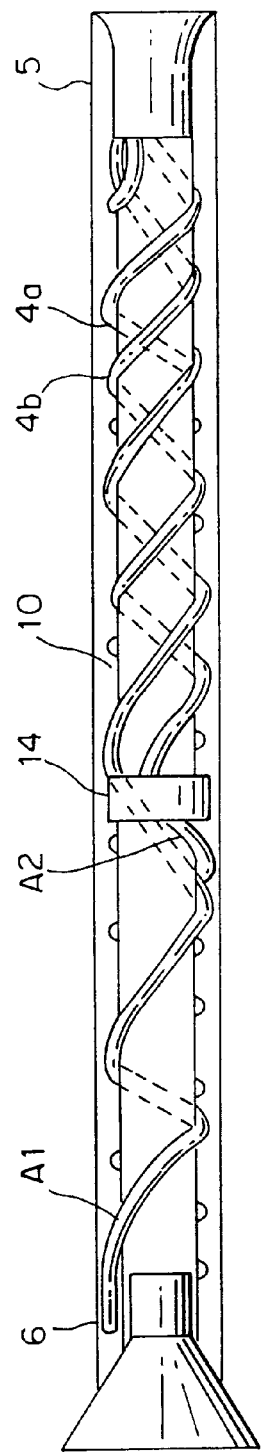
FIG. 3 shows, partly in cross section, an alternative to the embodiment of FIG. 2.
Figure 4:
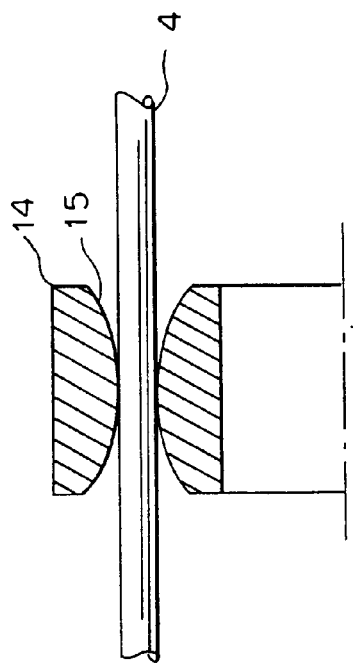
FIG. 4 shows a cross section of a part of an attachment point of the stiffener.

FIG. 3 shows a tube device similar to that in FIG. 2, which is also suitable for exhaustion of smoke and the like. Two stiffening strings 4a, 4b are provided at the end 5 of the tube device that is intended to be fixed, one 4a of which extends along the entire length of the flexible part of the device and is fixed to connecting means 6 at the other end, and one 4b of which only extends a part of this length to a position somewhat beyond intermediate fixing means 14, which substantially has a ring shape and is provided with apertures 15, as shown in FIG. 4, through which the stiffening string extends. The intermediate fixing means may be provided with such apertures for both of the strings 4a, 4b. The apertures 15 are funnel shaped with a surface cambered outwards from the string formed by a generatrix with an arch shape bent from the string. This arch shaped, funnel shaped surface contributes to preventing locally plastically bending deformations of the strings by supporting the strings. Corresponding supports may be provided at the attachment points of the strings at the connecting means 5, 6. FIG. 3 also shows that one of the strings 4a may have a cross sectional area A1 smaller than the area A2 of the other string 4b, i.e the string 4a may have a smaller bending resistance than the other string 4b even if they are made of the same material.

The invention will now be described closer by means of an example, which is not intended to limit the scope of the invention.

EXAMPLE 1

A flexible tube device according to the invention, which may be used as an exhaustion device and generally designed as in FIG. 1, comprised two end connecting means 5, 6 with an inner tube having an outer diameter of 38 mm and an outer tube having an outer diameter of 50 mm. An inner hose 3 of rubber was threaded on the inner tubes of the end connecting means 5, 6, said inner hose having a corrugated bellows like wall with a screw shaped reinforcement of steel wire within the screw shaped corrugation, having a pitch of 8 mm per turn with an unloaded hose. The inner diameter of the hose was 38 mm and the outer diameter was 43 mm and the wall thickness about 1 mm. The extensibility of the hose in the lengthwise direction was limited by moulded cord threads of organic fibre. An outer hose 2 of the same type as the inner hose was threaded on the outer tube, said outer hose 2 having an inner diameter of 50 mm and an outer diameter of 58 mm. A stiffener 4 was provided between the inner and outer hose, said stiffener 4 being a wire with a thickness of 5 mm of dead annealed soft carbon steel, and attached at the end connections 5, 6 and extending screw like around the inner hose for about one turn between the end connections. The length of the flexible hoses between the end connections 5, 6 was about 700 mm. End connections made of steel, with the stiffener 4 fixed thereto by welding, and of plastic, with the stiffener fixed thereto by gluing were tested successfully. Inner hoses 3 with sealed and perforated walls were tested, in the latter case with an empty space between the hoses as well as a space filled with inorganic fibres to improve the sound absorbtion. This tube device was provided with one end fixed to a conducting tube for exhaustion of air and with the other end, which was provided with an inlet funnel, freely moveable. The moveable end could by hand be adjusted to the desired position and with the desired direction showing an insignificant spring back when released. The inner hose with its substantially plain inner surface gave a low flow resistance, and the embodiment with apertures in the wall of the inner hose and with a filling of fibrous material in the space between the hoses gave a particularly good sound absorbtion.

I claim:

1. A flexible tube device, which is repeatedly reshapeable by action of reshaping forces comprising bending forces and which has the capability of substantially maintaining a shape received at the reshaping as the forces are released, and wherein the flexible tube device comprises a flexible inner hose and a flexible outer hose spaced apart from and surrounding the inner hose, said outer hose being located along substantially the entire length of the inner hose, a bend stiffening member provided in the space between the inner hose and the outer hose and which is plastically deformable by reshaping of the tube device and, which after removal of the reshaping forces, substantially retains the shape received at the plastic deformation which thereby substantially determines the shape of the tube device.

2. Tube device according to claim 1, having end connecting means fixed to a first end of the tube device, each end of the inner hose (3), the outer hose (2) and the bend stiffening member (4) being attached to said connecting means (6), a second end of the device being engaged in a fixed position, said tube device being adjustable by hand to a desired position and in a desired direction by plastic deformation of the bend stiffening member under the influence of reshaping forces applied at first end of the tube device which is not fixed, at a distance that is less than 20% of the length of the tube device from the first end.

3. Tube device according to claim 2, wherein the inner and the outer hose are made completely of bendable materials including rubber, plastic, metal and a combination of two or more of said materials.

4. Tube device according to claim 3, wherein the inner hose and the outer hose are provided with a stiffening means, which has a capability to prevent deformation of the hose in a radial direction and extends around the circumference of each said hose along substantially the entire length of a flexible part, said stiffening means being embedded in a hose wall, and made of a string shaped material including metal.

5. Tube device according to claim 4, wherein the bend stiffening member comprises at least one string shaped means (4) of metal with an elongation at rupture of between 10 to 40% and with a yield strength of less than 30 to 20 kp/mm$^2$, said metal including soft and dead annealed unalloyed and low alloyed steel and stainless steel with a low carbon content.

6. Tube device according to claim 5, wherein the inner hose (3) is provided with sound absorbing apertures distributed along a lengthwise direction of the inner hose and leads to the space between the inner hose (3) and the outer hose (4), said space containing sound absorbing means including fibrous material and porous material.

7. Tube device according to claim 6, wherein the device exhibits a gradually decreasing bending resistance starting from the connecting means (5), which is suitable for fixed attachment, towards a second end of the device, under the influence of bending forces that act perpendicularly against a longitudinal axis of the device.

8. Tube device according to claim 7, wherein the first end of the device is provided with a first end connecting means (5) suitable for fixed attachment to a conduit and the second end of the device is provided with a second end connecting means (6) which is adjustable and directable by hand, said second end connecting means being engaged to inflowing and outflowing means for gas or liquid, a number of bend stiffening means extending between and integrated with said first and second end connecting means (5, 6).

9. Tube device according to claim 1, wherein the inner and the outer hose are made completely of bendable materials including rubber, plastic, metal and a combination of two or more of said materials.

10. Tube device according to claim 1, wherein the inner hose and the outer hose are provided with stiffening means, which has a capability to prevent deformation of the hose in a radial direction and extends around the circumference of each said hose along substantially the entire length of a flexible part, said stiffening means being embedded in a hose wall, and made of a string shaped material including metal.

11. Tube device according to claim 10, wherein the bend stiffening member comprises at least one string shaped means (4) of metal with an elongation at rupture of between 10 to 40% and with a yield strength of less than 30 to 20 kp/mm$^2$, said metal including soft and dead annealed unalloyed and low alloyed steel and stainless steel with a low carbon content.

12. Tube device according to claim 11, wherein the inner hose (3) is provided with sound absorbing apertures distributed along a lengthwise direction of the inner hose and leads to the space between the inner hose (3) and the outer hose (4), said space containing sound absorbing means including fibrous material and porous material.

13. Tube device according to claim 12, wherein the device exhibits a gradually decreasing bending resistance starting from end connecting means (5), which is suitable for fixed attachment, towards a second end of the device, under the influence of bending forces that act perpendicularly against a longitudinal axis of the device.

14. Tube device according to claim 13, wherein the first end of the device is provided with a first end connecting means (5) suitable for fixed attachment to a conduit and the second end of the device is provided with a second end connecting means (6) which is adjustable and directable by hand, said second end connecting means being engaged to inflowing and outflowing means for gas or liquid, a number of bend stiffening means extending between and integrated with said first and second end connecting means (5, 6).

* * * * *